(12) United States Patent
Chen

(10) Patent No.: US 12,628,971 B1
(45) Date of Patent: May 19, 2026

(54) HOLDER FOR CONTAINER AND CONTAINER WITH HOLDER

(71) Applicant: Boyong Chen, Chaozhou City (CN)

(72) Inventor: Boyong Chen, Chaozhou City (CN)

(*) Notice: Subject to any disclaimer, the term of this patent is extended or adjusted under 35 U.S.C. 154(b) by 0 days.

(21) Appl. No.: 19/359,627

(22) Filed: Oct. 15, 2025

(51) Int. Cl.
*A47G 19/10* (2006.01)
*F16B 47/00* (2006.01)

(52) U.S. Cl.
CPC .............. *A47G 19/10* (2013.01); *F16B 47/00* (2013.01)

(58) Field of Classification Search
CPC ......... A47G 19/00; A47G 19/10; F16B 47/00; F16M 11/00; F16M 13/00
See application file for complete search history.

(56) References Cited

U.S. PATENT DOCUMENTS

| | | | | |
|---|---|---|---|---|
| 2,108,863 A | * | 2/1938 | Kieft | A47G 29/093 248/362 |
| 2,172,140 A | * | 9/1939 | Kieft | A47G 19/10 126/246 |
| 2,542,400 A | * | 2/1951 | Donofrio | A47G 19/10 248/362 |
| 2,588,990 A | * | 3/1952 | Sanchez | A47G 19/02 248/362 |
| 5,000,123 A | * | 3/1991 | Morse | A01K 5/0135 119/61.54 |
| D376,295 S | * | 12/1996 | Ahern, Jr. | D7/553.6 |
| 6,318,683 B1 | * | 11/2001 | Savoy | A47G 23/0225 403/348 |
| 6,688,485 B1 | * | 2/2004 | Lauer | A47G 19/08 220/636 |
| 6,814,250 B1 | * | 11/2004 | Madsen | A47G 19/065 220/921 |
| 7,806,288 B2 | * | 10/2010 | Young | A47G 19/02 220/666 |
| 7,984,821 B1 | * | 7/2011 | Malmberg | E04D 15/00 220/570 |
| 8,342,350 B2 | * | 1/2013 | Jain | A01K 5/0135 220/636 |
| 9,924,698 B2 | * | 3/2018 | Babal | A01K 7/005 |
| 11,317,745 B2 | * | 5/2022 | Braveheart | A47G 29/093 |
| 2012/0104214 A1 | * | 5/2012 | St. Jacques | A01K 5/0135 248/346.5 |
| 2018/0343826 A1 | * | 12/2018 | Kumar | A01K 5/0135 |
| 2025/0295256 A1 | * | 9/2025 | Kerr | A47G 19/10 |

* cited by examiner

*Primary Examiner* — Monica E Millner

(57) ABSTRACT

The present disclosure provides a holder for a container and a container with a holder, they include a container and a holder main body. The holder main body includes a bottom wall and a side wall connected to the bottom wall. The side wall surrounds to form an accommodating cavity and an opening in communication with the accommodating cavity. The accommodating cavity is configured for accommodating the container. The holder main body is provided with an attraction device. The attraction device is configured for attracting the holder for the container on an external area.

17 Claims, 7 Drawing Sheets

HOLDER FOR CONTAINER AND CONTAINER WITH HOLDER

BACKGROUND ART

With the improvement of living standards, children's special plates have become a modern home necessity, which is not only a food container, but also a tool for culturing children's independent eating habits.

However, the existing products are mostly focused on the appearance design, but the stability problem during use is ignored. The baby is active when eating and is prone to accidentally touching the plate, causing it to slide from the desktop. This not only wastes food and increases the burden of cleaning but also makes it become more likely to cause potential safety hazards such as scalding and scratching due to hot-food splashing or plate crushing.

Therefore, there is an urgent need for a holder for a container and a container with a holder to effectively prevent the container from accidentally moving or overturning, thereby improving the use safety and reducing the caring pressure of the parents.

SUMMARY

In order to overcome the shortcomings of the prior art, the technical solution adopted by the present disclosure to solve the technical problem is as follows.

The present disclosure provides a holder for a container. The holder for the container includes a holder main body.

The holder main body includes a bottom wall and a side wall connected to the bottom wall. The side wall surrounds to form an accommodating cavity and an opening in communication with the accommodating cavity. The accommodating cavity is configured for accommodating the container main body. The holder main body is provided with an attraction device. The attraction device is configured for attracting the holder for the container on an external area.

As an improvement of the present disclosure, the attraction device is connected to a lower side of the bottom wall. The holder main body includes at least two attraction devices. The at least two attraction devices are arranged in an axial direction below the bottom wall. The attraction device is a suction cup.

As an improvement of the present disclosure, the bottom wall is provided with a hollow groove.

As an improvement of the present disclosure, the attraction device includes a first outer edge in a bottom view direction of the holder main body. The first outer edge does not extend into the hollow groove. The hollow groove includes a third outer edge. A distance between the first outer edge and the third outer edge is in a range from 0 cm to 5 cm.

As an improvement of the present disclosure, the attraction device includes the first outer edge. The holder main body includes a second outer edge in the bottom view direction of the holder main body. The first outer edge does not extend out of the second outer edge. A distance between the first outer edge and the second outer edge is in a range from 0 cm to 8 cm.

As an improvement of the present disclosure, the hollow groove is a circular hollow out groove or a quadrilateral hollow groove or a flower-shaped hollow groove or a triangular hollow groove or a hexagonal hollow groove or a pentagonal hollow groove or a pentagonal hollow groove or a star-shaped hollow groove or an irregular polygonal hollow groove.

As an improvement of the present disclosure, the holder main body is a flexible holder main body; or the holder main body is an elastic holder main body.

As an improvement of the present disclosure, an upper end portion of the side wall is provided with a limiting groove. The limiting groove is configured for accommodating a circumferential edge of the container, and when the container is placed in the accommodating cavity and the circumferential surrounding edge is placed in the limiting groove, the limiting groove is configured for limiting the container in the accommodating cavity.

As an improvement of the present disclosure, an upper end portion of the side wall is bent outward to form a lower wrapping edge, a bending portion, and an upper wrapping edge sequentially connected. The lower wrapping edge, the bending portion, and the upper wrapping edge cooperatively surround to form the limiting groove.

As an improvement of the present disclosure, when the container is placed in the accommodating cavity and the circumferential surrounding edge is placed in the limiting groove, the upper wrapping edge at least partially covers an upper surface of the circumferential edge.

As an improvement of the present disclosure, an area of a bottom surface of the attraction device is in a range from 3 cm$^2$ to 80 cm$^2$. A length of the holder main body is in a range from 0.8 to 20 inches. A width of the holder main body is in a range from 0.8 to 15 inches. A height of the holder main body is in a range from 0.4 to 15 inches. A thickness of the holder main body is in a range from 1 mm to 25 mm.

As an improvement of the present disclosure, the holder main body is a silicone holder main body. The holder main body is integrally formed with the attraction device.

The present disclosure further provides a container with a holder, including the holder and the container according to claim 1.

As an improvement of the present disclosure, the holder main body is detachably connected to the container.

As an improvement of the present disclosure, the holder main body is integrally formed with the container.

As an improvement of the present disclosure, the holder main body is fixedly connected to the container.

As an improvement of the present disclosure, a material of the holder main body is different from a material of the container.

As an improvement of the present disclosure, the container is a rigid container. A hardness of the holder main body is less than a hardness of the container.

As an improvement of the present disclosure, the container is a metal container or a ceramic container.

As an improvement of the present disclosure, the container is provided with the circumferential edge. When the container is placed in the accommodating cavity and the circumferential edge is placed in the limiting groove, the limiting groove is configured for limiting the container in the accommodating cavity. A length of the container is in a range from 1 inch to 15 inches. A width of the container is in a range from 1 inch to 15 inches. A height of the container is in a range from 0.5 inches-10 inches. A thickness of the container is in a range from 3 mm to 15 mm.

The present disclosure has the following beneficial effects. The present disclosure provides the holder for the container and the container with the holder. They include the container and the holder main body. The holder main body includes the bottom wall and the side wall connected to the bottom wall. The side wall surrounds to form the accommodating cavity and the opening in communication with the accommodating cavity. The accommodating cavity is configured for accommodating the container. The holder main body is provided with an attraction device. The attraction device is configured for attracting the holder for the container on the external area. Through the above structure, since the holder main body includes the bottom wall and the surrounding side wall, when the container is placed in the accommodating cavity, the holder main body wraps around an outer wall of the adapted container. Moreover, arranging the attraction device on the holder main body allows the holder main body to be firmly attracted on the external area such as the desktop, thereby effectively preventing the container from tipping over due to collision or dragging. It is particularly suitable for children, greatly improving the safety and stability of use.

BRIEF DESCRIPTION OF THE DRAWINGS

Implementations of the present disclosure will now be described, by way of embodiment, with reference to the attached figures. It should be understood, the drawings are shown for illustrative purpose only, for ordinary person skilled in the art, other drawings obtained from these drawings without paying creative labor by an ordinary person skilled in the art should be within scope of the present disclosure.

DETAILED DESCRIPTION OF THE EMBODIMENTS

Figure 1:
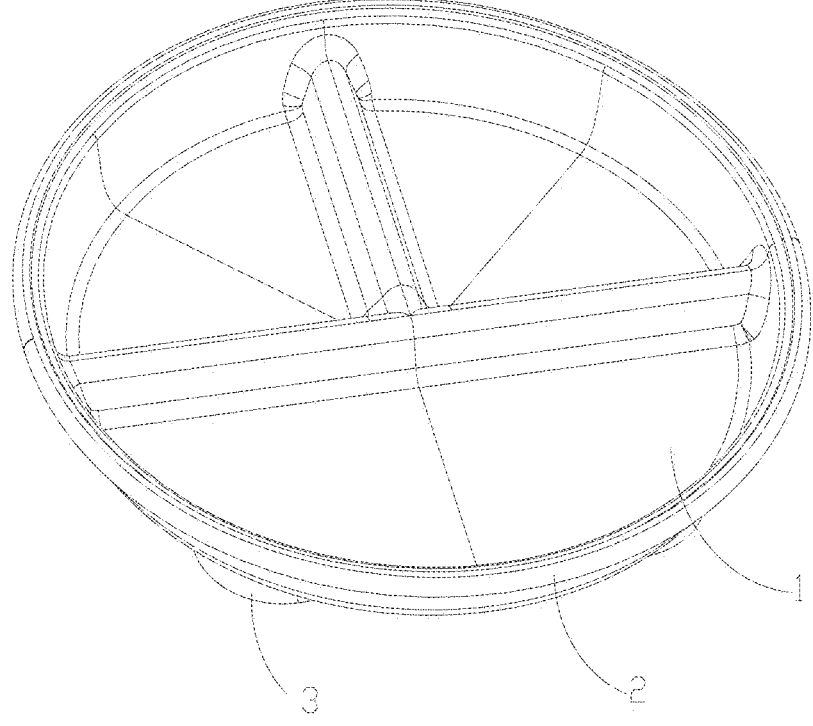
FIG. 1 is a schematic diagram of an overall structure of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one". In addition, the terms "first" and "second" are used for descriptive purposes only and cannot be understood as indicating or implying relative importance or implying the number of indicated technical features. Thus, the features defined as "first" and "second" may explicitly or implicitly include one or more of the features. In the description of embodiments of the application, "a plurality of" means two or more, unless otherwise specifically defined.

Embodiment 1

Figure 2:
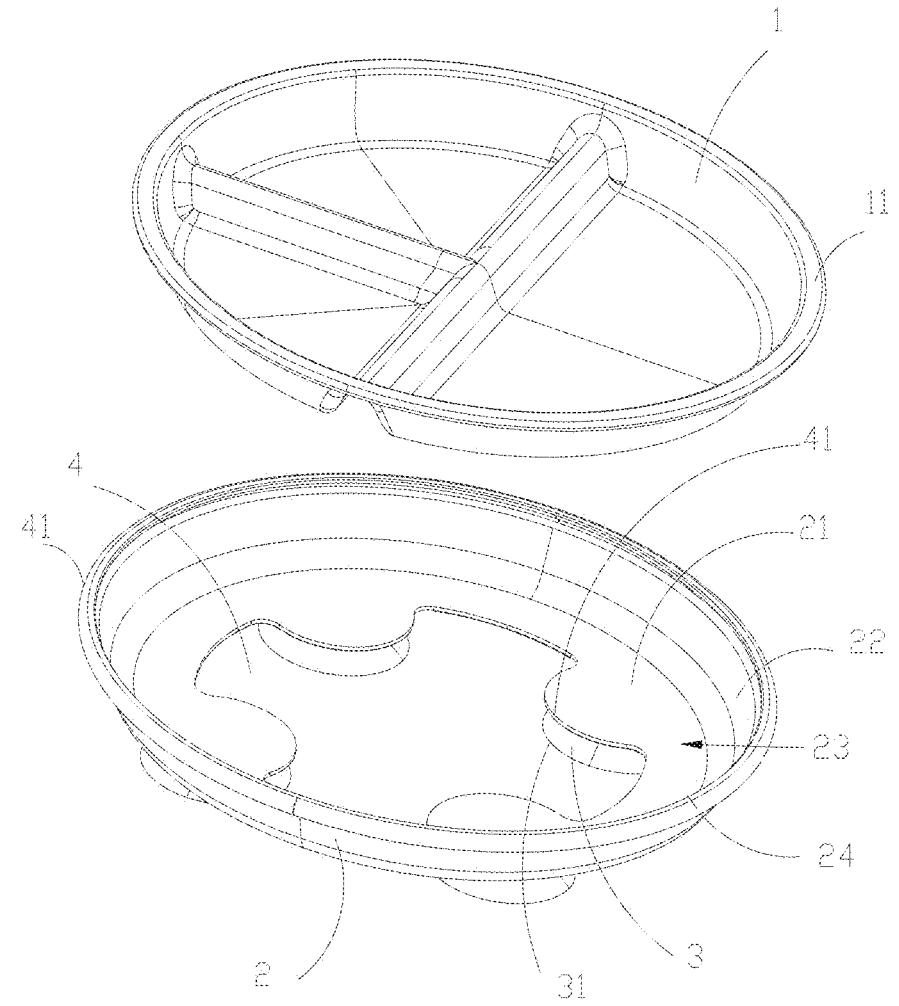
FIG. 2 is an exploded view of a container and a holder main body of the present disclosure.
Figure 3:
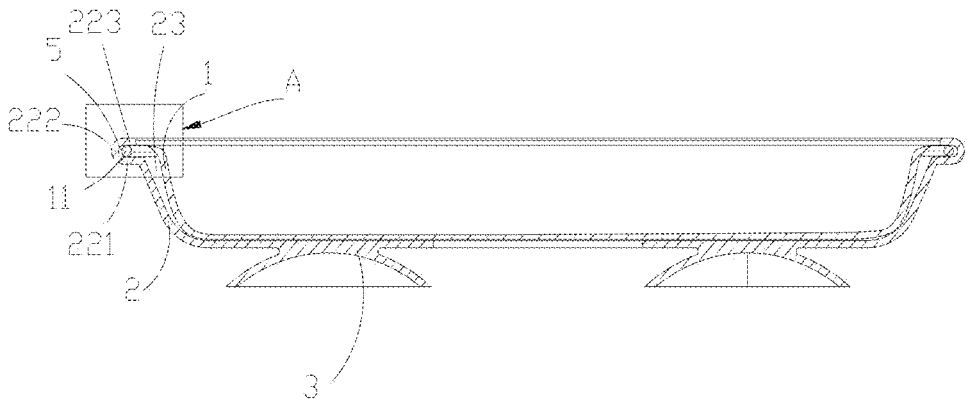
FIG. 3 is a cross-sectional view of the container and the holder main body of the present disclosure.
Figure 4:
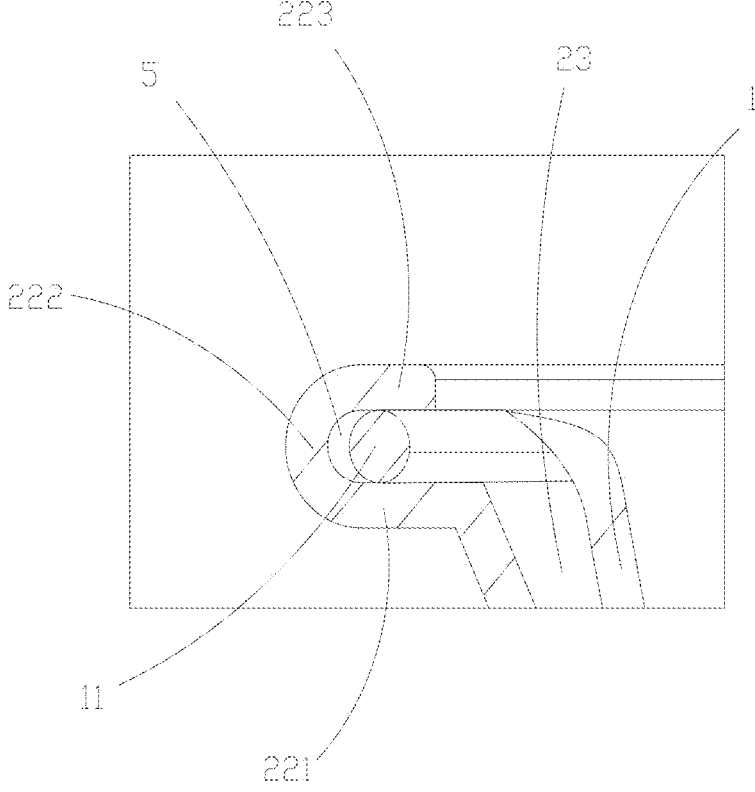
FIG. 4 is an enlarged view at A of FIG. 3.
Figure 5:
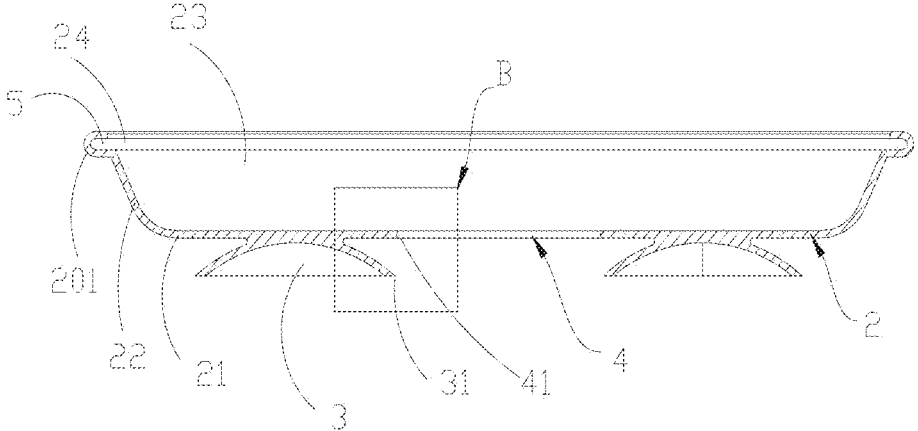
FIG. 5 is a cross-sectional view of the holder main body of the present disclosure.
Figure 6:
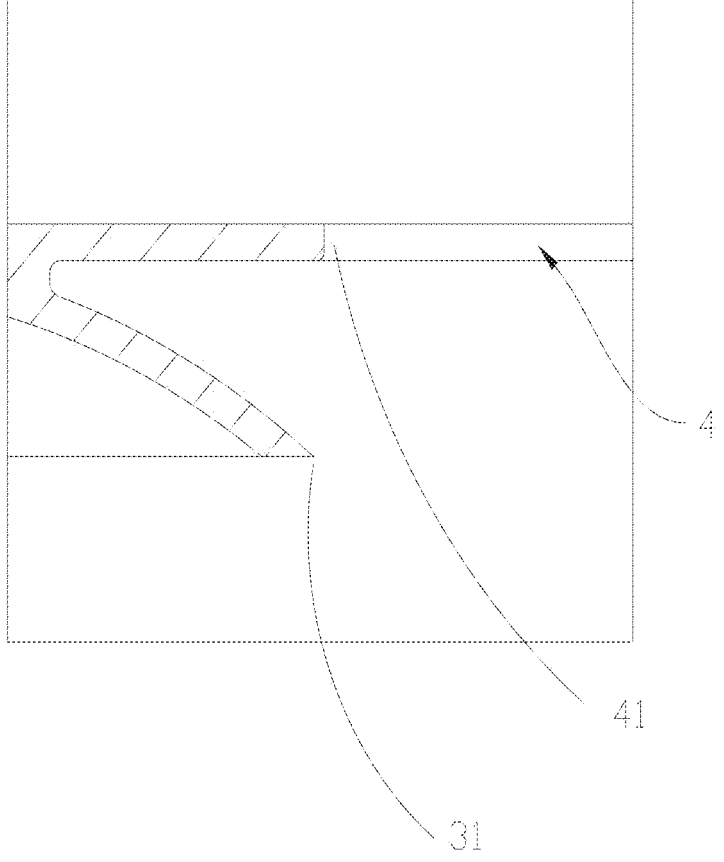
FIG. 6 is an enlarged view at B of FIG. 5.
Figure 7:
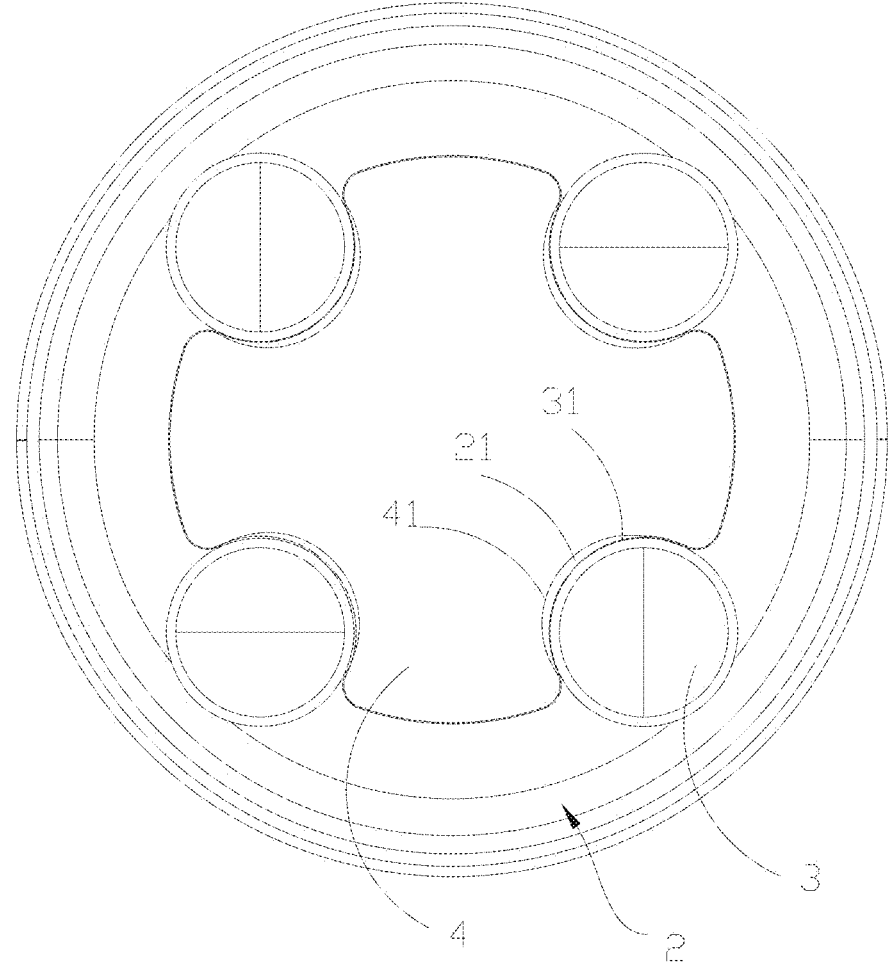
FIG. 7 is a bottom view of the holder main body of the present disclosure.

Referring to FIGS. 1-7, a holder for a container includes a holder main body 2.

The holder main body 2 includes a bottom wall 21 and a side wall 22 connected to the bottom wall 21. The side wall 22 surrounds to form an accommodating cavity 23 and an opening 24 in communication with the accommodating cavity 23. The accommodating cavity 23 is configured for accommodating the container 1.

Through the described structure above, since the holder main body 2 includes the bottom wall 21 and the surrounding side wall 22, when the container 1 is placed in the accommodating cavity 23, the holder main body 2 wraps around an outer wall of the adapted container 1. Moreover, arranging the attraction device 3 on the holder main body 2 allows the holder main body 2 to be firmly attracted on an external area such as a desktop, thereby effectively preventing the container from tipping over due to collision or dragging. It is particularly suitable for children, greatly improving the safety and stability of use.

In the present embodiment, the attraction device 3 is connected to a lower side of the bottom wall 21. The holder main body 2 includes at least two attraction devices 3. The at least two attraction devices 3 are arranged in an axial direction below the bottom wall 21. Herein, a total number of the attraction device 3 can be three, four, five, etc. Specifically, the attraction device 3 is a suction cup. Through the described structure above, the at least two suction cups are connected to the lower side of the bottom wall 21 of the holder main body 2 as the attraction device 3 and they are arranged in an axial direction, therefore, a plurality of evenly distributed adsorption force points form, thereby greatly enhancing an overall adsorption stability of the holder main body 2 attracted on a smooth surface such as a desktop.

In the present embodiment, the bottom wall 21 is provided with a hollow groove 4. Through the described structure above, since the bottom wall 21 is provided with the hollow groove 4, when the container 1 is placed in the accommodating cavity 23, a bottom of the container 1 can be exposed via the hollow groove 4. When the container 1 needs to be separated from the holder main body 2, the user can abut against the bottom of the exposed container 1 with one hand, and simultaneously pry an edge of the side wall 22 of the holder main body 2 with the other hand, to easily disengage the container 1 from the holder main body 2. At the same time, the hollow groove 4 can reduce an overall weight of the holder main body 2, reduce material usage, and lower the production cost.

In the present embodiment, the absorption device 3 includes a first outer edge 31 in a bottom view direction of the holder main body 2, and the first outer edge 31 does not extend into the hollow groove 4. The hollow groove 4 includes a third outer edge 41. A distance between the first outer edge 31 and the third outer edge 41 is in a range from 0 cm to 5 cm. Through the described structure above, it is ensured that the hollow groove 4 can be completely exposed, thereby avoiding interference with the hollow groove 4 when separating the container 1 from the holder main body 2, and facilitating the aesthetic and personalized design of the holder main body 2 and the suction cup, thereby improving the product purchase appeal.

In the present embodiment, the attraction device 3 includes the first outer edge 31. The holder main body 2 includes a second outer edge 201 in the bottom view direction of the holder main body 2. The first outer edge 31 does not extend out of the second outer edge 201. A distance between the first outer edge 31 and the second outer edge 201 is in a range from 0 cm to 8 cm. Further, the bottom wall 21 includes a fourth outer edge 211 in the bottom view direction of the holder main body 2. The first outer edge 31 does not extend out of the fourth outer edge 211.

Through the described structure above, the attraction device 3 can be completely in the outer edge of the holder main body 2, thereby preventing the attraction device 3 from protruding out of a boundary of the holder main body 2, and ensuring the integrity and aesthetics of an overall appearance of the holder main body 2.

In the present embodiment, the hollow groove 4 is a circular hollow groove 4 or a quadrilateral hollow groove 4 or a flower-shaped hollow groove 4 or a triangular hollow groove 4 or a hexagonal hollowed-out groove 4 or a pentagonal hollow groove 4 or a pentagonal hollow groove 4 or an irregular polygonal hollow groove 4. Through the structure above, the hollow groove 4 is designed into multiple shapes such as a circle, a quadrilateral, a pattern, a triangle, a hexagon, a pentagon, a star, or an irregular polygon in different embodiments, so that different styling requirements can be met, and the appearance diversity and aesthetics of the product can be improved.

In the present embodiment, the container 1 includes a circumferential edge 11. An upper end portion of the side wall 22 is provided with a limiting groove 5. The limiting groove 5 is configured for accommodating the circumferential edge 11. When the container 1 is placed in the accommodating cavity 23 and the circumferential edge 11 is placed in the limiting groove 5, the limiting groove 5 is configured for limiting the container 1 in the accommodating cavity 23. Herein the limiting groove 5 is continuously arranged around a periphery of the holder main body 2. Through the described structure above, since the limiting groove 5 is provided, when the container 1 is placed in the accommodating cavity 23 of the holder main body 2, the circumferential edge 11 can be placed in the limiting groove 5, therefore the limiting groove 5 can limit the container 1 in the accommodating cavity 23 of the holder main body 2 to complete the connection between the holder main body 2 and the container 1. When it is necessary to separate the container 1 from the holder main body 2, the user only need to pry the side wall 22 to disengage the circumferential edge 11 from the limiting groove 5. After the circumferential edge 11 is completely disengaged from the limiting groove 5, the container 1 can be easily separated from the holder main body 2.

In the present embodiment, the upper end portion of the side wall 22 is bent outwards to form a lower wrapping edge 221, a bending portion 222, and an upper wrapping edge 223 sequentially connected. The lower wrapping edge 221, the bending portion 222, and the upper wrapping edge 223 cooperatively surround to form the limiting groove 5. When the container 1 is placed in the accommodating cavity 23 and the circumferential edge 11 is placed in the limiting groove 5, the upper wrapping edge 223 at least partially covers an upper surface of the circumferential edge 11. Through the described structure above, the upper end portion of the side wall 22 is bent outwards to form the lower wrapping edge 221, the bending portion 222, and the upper wrapping edge 223, and the lower wrapping edge 221, the bending portion 222, and the upper wrapping edge 223 cooperatively surround to from the limiting groove 5, so that the container 1 can be firmly connected in the holder main body 2. Moreover, the upper wrapping edge 223 covers the upper surface of the circumferential edge 11 of the container 1 to form an effective stop and limit, thereby ensuring that the container 1 is positioned stably in the holder main body 2, and preventing deviation or slipping during use.

Further, the holder main body 2 is a flexible holder main body 2; or the holder main body 2 is an elastic holder main body 2.

Further, the holder main body 2 is a silicone holder main body 2.

Through the described structure above, manufacturing the holder main body 2 from flexible and elastic food-grade silicone enables a firmer wrapped connection between the holder main body 2 and the container 1, and the holder main body 2 can be conveniently separated from the container 1. During daily use, if the container is accidentally dropped or hit, a flexible silicone outer layer can effectively cushion the impact force, reduce the risk of cracking or damage to a rigid main body, and prolong the service life of the container.

In the present embodiment, an area of a bottom surface of the attraction device 3 is in a range from 3 cm$^2$ to 80 cm$^2$. Through the above structure, within the area range, the attraction device 3 can ensure a strong adsorption effect of the attraction device 3 and improve the stability of the holder main body 2 attracted on the external area such as the desktop.

In the present embodiment, a length of the holder main body 2 is in a range from 0.8 inches to 20 inches. A width of the holder main body 2 is in a range from 0.8 to 15 inches. A height of the holder main body 2 is in a range from 0.4 to 15 inches. A thickness of the holder main body 2 is in a range from 1 mm to 25 mm. Through the above structure, within the size range, the holder main body 2 is applicable to various scenarios in daily life, for instance, it can be placed on a platform of a lunch desk or a stroller.

In this embodiment, the holder main body 2 and the attraction device 3 are integrally formed. Through the above structure, the holder main body 2 and the attraction device 3 are integrally formed, thus, there is no assembly gap or seam between the holder main body 2 and the attraction device 3, facilitating cleaning and ensuring the stable connection between the attraction device 3 and the holder main body 2.

Embodiment 2

Referring to FIG. 1 to FIG. 7, a container with a holder includes the holder main body 2 and the container 1 in Embodiment 1. Through the above structure, since the holder main body 2 includes the bottom wall 21 and the surrounding side wall 22, when the container 1 is placed in the accommodating cavity 23, the holder main body 2 wraps around the outer wall of the adapted container 1. Moreover, the attraction device 3 provided on the holder main body 2 allows the holder main body 2 to be firmly attracted on external areas such as a desktop, thereby effectively preventing the container from tipping over due to collision or dragging. It is particularly suitable for children, greatly improving the safety and stability of use.

In this embodiment, the holder main body 2 is detachably connected to the container 1. Through the described structure above, the holder main body 2 and the container 1 can be detachably connected, so that the user can quickly install or separate the holder main body 2 and the container 1 when needed, thereby facilitating the cleaning, storage and transportation of the container. At the same time, the detachable arrangement also facilitates the replacement or selection of different types of holder main bodies 2 according to different use requirements, enhancing flexibility and applicability.

In the present embodiment, the container 1 includes a circumferential edge 11. An upper end portion of the side wall 22 is provided with a limiting groove 5. The limiting groove 5 is configured for accommodating the circumferential edge 11. When the container 1 is placed in the accommodating cavity 23 and the circumferential edge 11 is placed in the limiting groove 5, the limiting groove 5 is configured for limiting the container 1 in the accommodating cavity 23. Herein the limiting groove 5 is continuously arranged around a periphery of the holder main body 2. Through the described structure, since the limiting groove 5 is provided, when the container 1 is placed in the accommodating cavity 23 of the holder main body 2, the circumferential edge 11 can be placed in the limiting groove 5, and limiting groove 5 can limit the container 1 in the accommodating cavity 23 of the holder main body 2 to complete the connection between the holder main body 2 and the container 1. When it is necessary to separate the holder main body 2 from the container 1, the user only need to pry the side wall 22 to disengage the circumferential edge 11 from the limiting groove 5. After the circumferential edge 11 is completely separated from the limiting groove 5, the container 1 can be easily separated from the holder main body 2.

In another embodiment, the holder main body 2 is fixedly connected to the container 1. The holder main body 2 can be connected to the container 1 via fixed connection such as adhesive bonding and welding. Through the described structure above, the assembly process is avoided, and the structure is more concise and stable, effectively reducing the risk of loosening which may occur at connection portions.

In another embodiment, the holder main body 2 is integrally formed with the container 1. Through the described structure above, the holder main body 2 and the attraction device 3 are integrally injection-molded, avoiding the assembly process, improving the production efficiency, and reducing the manufacturing cost. And the structure facilitates the user's daily use, for example, the integrally formed holder main body 2 and the container 1 can be directly placed in a dishwasher for cleaning. A surface of the integrally formed holder main body 2 and the container 1 is smooth without seams or hard-to-reach areas, which is easier to clean, and does not need to be assembled after cleaning, thereby greatly improving the convenience of use.

In this embodiment, the holder main body 2 is different from the container 1 in material.

Further, a hardness of the holder main body 2 is less than a hardness of the container 1.

Further, the container 1 is a rigid container 1.

Specifically, the container 1 is a metal container 1 or a ceramic container 1.

Through the described structure above, manufacturing the container 1 from a rigid material of a high hardness ensures the durability of the container 1. At the same time, manufacturing the holder main body 2 from a flexible and elastic food-grade silicone of a low hardness enables a firmer wrapped connection between the holder main body 2 and the container 1, and the holder main body 2 and the container 1 can be conveniently separated from each other.

In the present embodiment, a length of the container 1 is in a range from 1 inch to 15 inches. A width of the container 1 is in a range from 1 to 15 inches. A height of the container 1 is in a range from 0.5 inches to 10 inches. A thickness of the container 1 is in a range from 3 mm to 15 mm. Through the structure above, the container 1 within the described size range can be adapted to the holder main body 2, and is also suitable for various scenarios in daily life, for instance, the container 1 can be placed on a platform of a lunch desk or a stroller.

The above description only describes embodiments of the present disclosure, and is not intended to limit the present disclosure; various modifications and changes can be made to the present disclosure. Any modifications, equivalent substitutions, and improvements made within the spirit and scope of the present disclosure are intended to be included within the scope of the present disclosure.

What is claimed is:

1. A holder for a container, comprising:
    a holder main body, the holder main body comprising a bottom wall and a side wall connected to the bottom wall; the side wall surrounding to form an accommodating cavity and an opening in communication with the accommodating cavity; the accommodating cavity being configured for accommodating the container; the holder main body being provided with an attraction device, and the attraction device being configured for attracting the holder for the container on an external area;
    wherein the bottom wall is provided with a hollow groove;
    wherein the attraction device comprises a first outer edge, the hollow groove comprises a third outer edge, at least a part of the third outer edge is shaped to match and surround at least a part of the first outer edge;
    wherein the number of the attraction devices is at least two, and the hollow groove forms at least one extension groove between the at least two attraction devices.

2. The holder for the container according to claim 1, wherein the attraction device is connected to a lower side of the bottom wall; the at least two attraction devices are arranged in an axial direction below the bottom wall; and the attraction device is a suction cup.

3. The holder for the container according to claim 1, wherein the first outer edge is arranged in a bottom view direction of the holder main body, and the first outer edge does not extend into the hollow groove; and a distance between the first outer edge and the third outer edge is in a range from 0 cm to 5 cm.

4. The holder for the container according to claim 1, wherein the holder main body comprises a second outer edge in a bottom view direction of the holder main body, the first outer edge does not extend out of the second outer edge; and a distance between the first outer edge and the second outer edge is in a range from 0 cm to 8 cm.

5. The holder for the container according to claim 1, wherein the hollow groove is a circular hollow groove or a quadrilateral hollow groove or a flower hollow groove or a triangular hollow groove or a hexagonal hollow groove or a pentagonal hollow groove or a pentagonal hollow groove or an irregular polygonal hollow groove.

6. The holder for the container according to claim 1, wherein the holder main body is a flexible holder main body; or the holder main body is an elastic holder main body.

7. The holder for the container according to claim 1, wherein an upper end portion of the side wall is provided with a limiting groove, the limiting groove is configured for accommodating a circumferential edge of the container; when the container is placed in the accommodating cavity and the circumferential edge is arranged in the limiting groove, the limiting groove is configured for limiting the container in the accommodating cavity.

8. The holder for the container according to claim 7, wherein the upper end portion of the side wall is bent outwards to form a lower wrapping edge, a bending portion, and an upper wrapping edge connected in sequence; the lower wrapping edge, the bending portion, and the upper wrapping edge cooperatively surround to form the limiting groove.

9. The holder for the container according to claim 8, wherein when the container is placed in the accommodating cavity and the circumferential edge is arranged in the limiting groove, the upper wrapping edge at least partially covers an upper surface of the circumferential surrounding edge.

10. The holder for the container according to claim 1, wherein an area of a bottom surface of the attraction device is in a range from 3 cm$^2$ to 80 cm$^2$; a length of the holder main body is in a range from 0.8 inches to 20 inches, a width of the holder main body is in a range from 0.8 to 15 inches, a height of the holder main body is in a range from 0.4 to 15 inches, and a thickness of the holder main body is in a range from 1 mm to 25 mm.

11. The holder for the container according to claim 1, wherein the holder main body is a silicone holder main body; and the holder main body and the attraction device are integrally formed.

12. A container assembly, comprising the holder and the container according to claim 1.

13. The container assembly according to claim 12, wherein the holder main body is detachably connected to the container.

14. The container assembly according to claim 12, wherein the holder main body is different from the container in material.

15. The container assembly according to claim 12, wherein the container is a rigid container, and a hardness of the holder main body is less than a hardness of the container.

16. The container assembly according to claim 12, wherein the container is a metal container or a ceramic container.

17. The container assembly a holder according to claim 13, wherein the container comprises a circumferential edge, and when the container is placed in the accommodating cavity and the circumferential edge is arranged in the limiting groove, the limiting groove is configured for limiting the container in the accommodating cavity; a length of the container is in a range from 1 inch to 15 inches, a width of the container is in a range from 1 inch to 15 inches, a height of the container is in a range from 0.5 inches to 10 inches, and a thickness of the container is in a range from 3 mm to 15 mm.

* * * * *